United States Patent [19]

Morishita et al.

[11] 4,144,710
[45] Mar. 20, 1979

[54] GAS TURBINE ENGINE

[75] Inventors: Teru Morishita; Manabu Kazaoka, both of Susono, Japan

[73] Assignee: Toyota Jidosha Kogyo Kabushiki Kaisha, Toyota, Japan

[21] Appl. No.: 809,019

[22] Filed: Jun. 22, 1977

[30] Foreign Application Priority Data

Apr. 15, 1977 [JP] Japan .............................. 52-042519

[51] Int. Cl.² .............................................. F02C 7/22
[52] U.S. Cl. .................................. 60/39.36; 60/39.71; 60/39.74 R
[58] Field of Search ............ 60/39.36, 39.71, 39.74 R, 60/39.46 G

[56] References Cited

U.S. PATENT DOCUMENTS

| | | | |
|---|---|---|---|
| 2,857,204 | 10/1958 | Gross | 60/39.74 R |
| 3,306,333 | 2/1967 | Mock | 60/39.74 R |
| 3,739,576 | 6/1973 | Chamberlain | 60/39.36 |

Primary Examiner—Louis J. Casaregola
Attorney, Agent, or Firm—Stevens, Davis, Miller & Mosher

[57] ABSTRACT

Disclosed is a gas turbine engine provided with an annular combustion chamber. The annular combustion chamber has, on an upstream side thereof, a first and a second row of angularly spaced injection nozzles adapted for introducing air into the combustion chamber. Fuel nozzles are opened to the corresponding injection nozzles in order to introduce vaporized fuel into the injection nozzles to form a combustible mixture therein, which mixture is ejected into the combustion chamber. Each adjacent two injection nozzles of the first and second rows are so arranged that a violent contact of the flow of combustible mixture from the adjacent two nozzles occurs in the combustion chamber.

6 Claims, 3 Drawing Figures

GAS TURBINE ENGINE

FIELD OF THE INVENTION

The present invention relates to a gas turbine engine provided with an annular combustion chamber.

BACKGROUND OF THE INVENTION

There has already been provided small size gas turbine engines, adapted for use in automobiles, which have an annular pre-mixing chamber arranged before an annular combustion chamber. The annular pre-mixing chamber operates to form a well-mixed combustible mixture of a relatively lean air-fuel ratio. This well-mixed and lean combustible mixture can be rapidly burnt in the annular combustion chamber under a low combustion temperature, which causes a decrease in the emission of nitrogen oxide ($NO_x$) components.

Generally speaking, in order to increase the thermal efficiency of a gas turbine engine it is necessary to introduce air of high temperature, usually above 450° C. which is higher than the self-igniting temperature of a fuel, into the pre-mixing chamber by the use of a heat exchanging device. However, this type of gas turbine engine suffers from a drawback in that the combustible mixture formed in the pre-mixing chamber is apt to stay for a prolonged time in the pre-mixing chamber due to a slow speed of the flow of the combustible mixture at a boundary layer of the pre-mixing chamber. This slow speed of the flow of the combustible mixture causes the fuel in the mixing chamber to be ignited by the high temperature of the air and generated a so-called back fire, which can cause damage to or even destruction of the engine.

SUMMARY OF THE INVENTION

An object of the present invention is to provide a gas turbine engine capable of preventing pre-ignition of the fuel and back fires, even if air of high temperature is supplied from the heat exchanging device.

Another object of the present invention is to provide a gas turbine engine capable of effectively decreasing $NO_x$ component emission.

Still another object of the present invention is to provide a gas turbine engine which is very conveniently utilized for an automobile.

The above objects can be attained by a gas turbine engine according to the present invention which comprises: a housing assembly; a shaft rotatably supported by the housing assembly; a set of compressor blades fixed to the shaft, said housing assembly forming an air passageway of annular shape adapted for receiving a flow of air from the compressor blades; a set of turbine blades fixed to the shaft in the housing assembly in such a way that the turbine blades are spaced apart from the compressor blades; a combustion chamber of annular shape located inside the housing assembly, said chamber facing, on a downstream side thereof, the turbine blades so as to cause the flow of combustion gas to be directed toward the turbine blades to rotate the shaft, said combustion chamber having, on an upstream side thereof, an annular wall adapted to isolate the combustion chamber from the air passageway, which annular wall defines a plurality of circumferentially spaced apart injection nozzles for communicating the air passageway with the combustion chamber so as to direct an amount of air from the passageway to the combustion chamber and defines a plurality of fuel nozzles which are, on one end thereof, opened to the corresponding injection nozzles, and are, on the other end thereof, opened to an annular fuel chamber formed in the circumferential direction of said wall, and; means for introducing vaporized fuel into said annular fuel chamber so as to direct the fuel into the corresponding injection nozzles via the corresponding fuel nozzles so that a combustible mixture is formed in each injection nozzle, which mixture is ejected into the combustion chamber. As a result of this arrangement, the combustible mixture formed in the injection nozzles located near the combustion chamber can be instantly introduced into the combustion chamber. Therefore, pre-ignition and back fires are effectively prevented.

Preferably, a first and second row of the injection nozzles are defined along the opposite sides of the annular fuel chamber, and each two adjacent injection nozzles of the first and the second rows are inclined with respect to each other. Thus, a violent contact of flows of the combustible mixture is formed in the combustion chamber, which allows a rapid and complete burning of lean air fuel mixture. Therefore, $NO_x$ emission from the engine can be effectively decreased.

DESCRIPTION OF A PREFERRED EMBODIMENT

Figure 1:
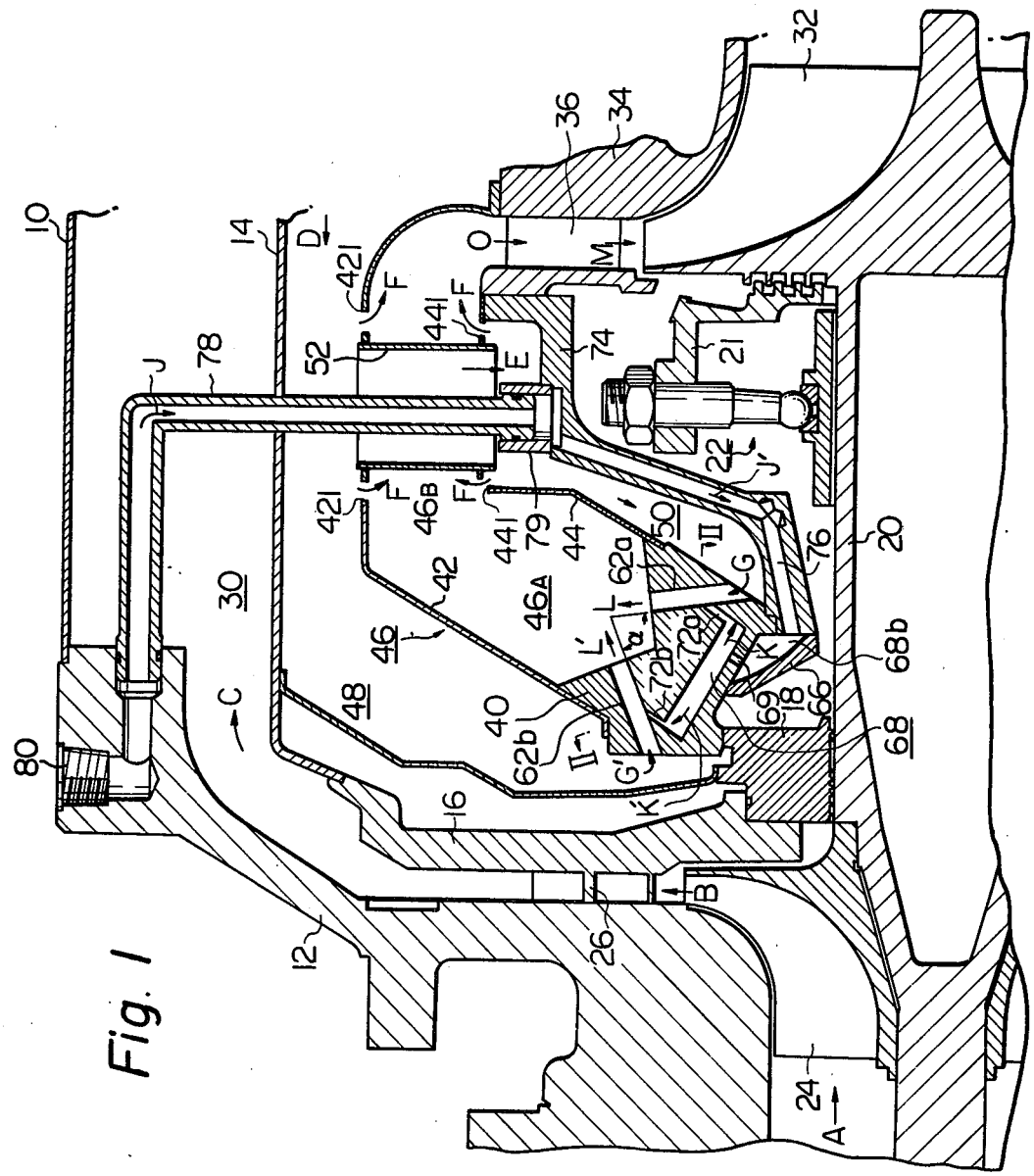
FIG. 1 is a longitudinal cross-sectional view showing a part of a gas turbine engine according to the present invention.

Referring to FIG. 1, numeral 10 designates an outer tubular housing of a gas turbine engine according to the present invention. Inside the outer housing 10, an inner tubular housing 14 is coaxially arranged. An outer front housing 12 of plate shape is fixedly secured to a front end of the outer tubular housing 10 and an inner front housing 16 of plate shape is fixedly secured to front end of the inner tubular housing 14. The inner front housing 16 has, at the center thereof, a sleeve member 18, the inner surface of which defines so-called labyrinth grooves.

A main shaft 2 rotatably inserted into the sleeve member 18 is supported by a bearing device (not shown) on one end of the shaft 20. On the other end of the main shaft 20, a well-known gas bearing device 22 is located. Therefore, high speed rotation of the main shaft 20 with respect to the housings 10, 12, 14 and 16 can be effected.

A set of equiangularly spaced compressor blades 24 are fixedly secured to the main shaft 20. A set of equiangularly spaced diffuser blades 26, each of which is integrally formed on one side of the inner front housing 16 near the outer front housing 12, is arranged around the set of compressor blades 24, so that an air flow from the compressor blades 24 is directed to the diffuser blades 26, as shown by an arrow B in FIG. 1. This air flow is, then, directed to an outer annular air passageway 30 formed between the outer tubular housing 10 and the inner tubular housing 14, as shown by an arrow C in FIG. 1.

Inside the inner tubular housing 14, an inner tubular air passageway 48 is formed. The passageway 48 is, on an upstream side thereof, connected to the outer air passageway 30 via a heat exchanging device (not shown), so that pre-heated air can be introduced into the inner passageway 48 as shown by an arrow D in FIG. 1.

A combustion chamber 46 of annular shape is arranged inside the inner tubular housing 14. The combustion chamber 46 comprises an outer tubular wall 42 and an inner tubular wall 44, so that another inner air passageway 50 of annular shape is formed inside the inner tubular wall 44. A plurality of pipe pieces 52 (only one of which is shown) are welded to the outer tubular wall 42 at the outer ends of the pipe pieces 52, and are welded to the inner tubular wall 44 at the inner ends of the pipe pieces 52. Therefore, pre-heated air introduced into the air passageway 48, as shown by the arrow D, can be introduced into the air passageway 50 via the pipe pieces 52, as shown by an arrow E in FIG. 1.

The tubular walls 42 and 44 have air holes 421 and 441, respectively, which are located on the downstream portion $46_B$ of the annular combustion chamber 46. Consequently, the air introduced into the air passageways 48 and 50, as shown by the arrows D and E, is mainly introduced, via the holes 421 and 441 as shown by arrows F in FIG. 1, into the downstream portion $46_B$ (cooling zone) of the combustion chamber 46 to cool the temperature of a combustion gas formed in an upstream portion $46_A$ (combustion zone) of the combustion chamber 46.

The annular combustion chamber 46 has, on an upstream side thereof, an annular wall in the form of a ring shaped member 40 arranged coaxially with respect to the main shaft 20. The ring shaped member 40 is stationarily fixed to the sleeve 18 as well as an annular housing member 74 which is fixedly secured to an inner housing 34, which in turn is rigidly assembled to the housings 10 and 14 by not shown means. The ring member 40 defines a first row of equiangularly spaced apart injection nozzles 62a adapted to communicate the air passageway 50 with the combustion zone $46_A$. To the injection nozzles 62a, air in the passageway 50, which is not directed to the cooling holes 441, is introduced as shown by an arrow G in FIG. 1. The ring member 40 also defines a second row of angularly spaced apart injection nozzles 62b adapted to communicate the air passageway 48 with the combustion zone $46_A$. To the injection nozzles 62b, air in the passageway 48, which is not directed to the cooling holes 421, is introduced as shown by an arrow G' in FIG. 1. As can be clearly seen from FIG. 1, a pair of a first injection nozzle 62a and a second injection nozzle 62b, which are located adjacent to each other, have axes which are inclined to each other in such a manner that said axes intersect with each other at a position in the combustion zone $46_A$. (The angle $\alpha$ between the two axes should be in a range of 30°–90°.) As a result of this arrangement a strong turbulence of flow is generated in the combustion zone $46_A$ as will be fully described later.

Figure 2:
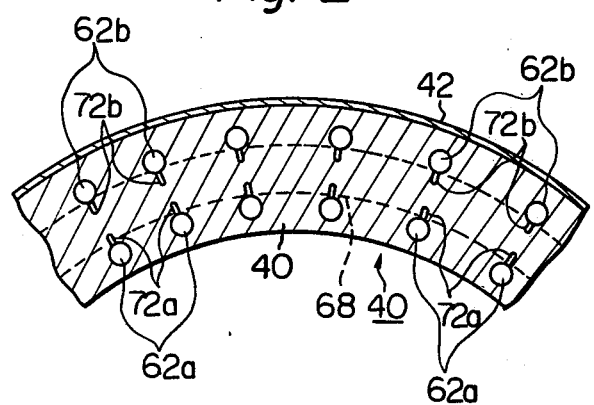
FIG. 2 is a sectional view taken along the line II—II in FIG. 1.

The ring member 40 defines an annular fuel supply chamber 68 of rectangular cross section which is located between the row of the first injection nozzles 62a and the row of the second injection nozzles 62b. The annular fuel supply chamber 68 communicates with the first injection nozzles 62a via respective fuel nozzles 72a, which are formed in the ring member 40 along the circumference thereof, as shown in FIG. 2. As a result, a flow of vaporized fuel is directed to each fuel nozzle 72a as shown by an arrow K in FIG. 1. Each of the fuel nozzles 72a, is, as is clearly shown in FIG. 1, opened to the corresponding injection nozzle 62a at a position spaced apart from an end of the nozzle 62a near the chamber 46. Therefore, the vaporized fuel introduced into the injection nozzle 62a via the corresponding fuel nozzle 72a is effectively mixed with the air introduced into the nozzle 62a as shown by the arrow G. Thus, an air-fuel mixture is formed, which is discharged into the annular combustion zone $46_A$ as shown by an arrow L in FIG. 1. The annular fuel supply chamber 68 also communicates with the second injection nozzles 62b via corresponding fuel nozzles 72b, which are formed in the ring member 40 along the circumference thereof. As a result, a flow of vaporized fuel is directed to each of the fuel nozzles 72b as shown by an arrow K' in FIG. 1. Each of the fuel nozzles 72b is, as is clearly shown in FIG. 1, opened to the corresponding injection nozzle 62b at a position spaced apart from an end of the nozzle 62b near to the chamber 46. Therefore, a well-mixed mixture is formed, which is discharged into the combustion zone $46_A$ as shown by an arrow L' in FIG. 1, via a respective injection nozzle 62b. The thus formed flows L and L' of the combustible mixture are burnt in the combustion zone $46_A$ to provide combustion gas which operates to rotate the shaft 20 as will be described later.

In order to supply vaporized fuel into the fuel supply chamber 68, an annular cover 66 is rigidly secured to the ring member 40 and an annular housing 74, which is integral with the inner housing 34, in such a manner that a fuel storing chamber 68b is formed between the ring member 40, the cover 66 and the annular housing 74. The annular housing 74 forms a fuel passageway 76 therein, which is on one end thereof opened to the fuel storing chamber 68b. The fuel passageway 76 is, on the other end thereof, connected to one end of a fuel tube 78 by a connecting piece 79. The fuel tube 78 is, on the other end thereof, connected to a fuel inlet port 80 formed in the front housing 12, to which port 80 a vaporized fuel supply source (not shown) is connected. Thus, vaporized fuel from the source can be introduced into the fuel tube 78, as shown by an arrow J in FIG. 1, and into the passageway 76 as shown by an arrow J' in FIG. 1. The ring member 40 has, on one side of the annular fuel passageway 68, a plurality of fuel holes 69 which are arranged along the circumference of the member 40, so that vaporized fuel in the chamber 68b from the passageway 76 can be introduced into the fuel supply chamber 68 via the fuel holes 69.

The gas turbine engine of the present invention further has a set of equiangularly spaced turbine blades 32 which are fixedly secured to the main shaft at a position axially spaced apart from the set of compressor blades 24. A set of equiangularly spaced guide blades 36 is arranged around the set of turbine blades 32, each guide blade 36 being stationarily fixed to the inner housing 34. As will be clearly seen from FIG. 1, the tubular walls 42 and 44 of the annular combustion chamber 46 are, on the downstream end of the walls, welded to the inner housing which carries the equiangularly spaced turbine blades 32, so that the cooling zone $46_B$ faces the guide blades on the downstream side of the zone $46_B$. Therefore, a flow of a combustible mixture, directed to the guide blades 36, as shown by an arrow O in FIG. 1, is ejected toward the tubine blades 32, as shown by an arrow M in FIG. 1, to rotate the shaft 20.

During the operation of the above-mentioned gas turbine engine, the intake air A from an air cleaner (not shown) is, as shown by the arrow B, directed toward the diffuser blades 26 due to the rotation of the compressor blades 24. The air from the diffuser blades 26 is directed, via the outer air passageway 30, as shown by the arrow C, to the heat exchanging mechanism (not shown). The air pre-heated in the heat exchanging mechanism is introduced into the air passageway 48, as shown by the arrow D. The air is also introduced into the air passageway 50 via the pipe pieces 52, as shown by the arrow E. Most of the air introduced into the annular air passageways 48 and 50 is introduced into the downstream side $46_B$ of the annular combustion chamber 46 via the cooling air holes 421 and 441, as shown by the arrows F. The remaining air in the passageways 50 and 48 is introduced into each of the first injection nozzles 62a and each of the second injection nozzles 62b, as shown by the arrows G and G', respectively.

The vaporized fuel from the fuel port 80 is introduced into the fuel storing chamber 68b via the fuel tube 78, as shown by the arrow J, and via the fuel passageway 76, as shown by the arrow J', and is introduced into the fuel supply chamber 68 via the fuel holes 69. The fuel in the chamber 68 is directed toward each of the fuel nozzles 72a, as shown by the arrow K, and is discharged to the corresponding first injection nozzle 62a, in order to form a flow of combustible mixture therein. The fuel in the chamber 68 is also directed toward each of the fuel nozzles 72b, as shown by the arrow K', and is discharged into the corresponding second injection nozzle 62b, in order to form a flow of the combustible mixture therein. The thus formed flows of combustible mixture in a pair of a first injection nozzle 62a and a corresponding second injection nozzle 62b are ejected into the combustion zone $46_A$ of the annular combustion chamber 46, as shown by the arrows L and L', respectively. The ejected mixture is burnt due to the high temperature in the zone $46_A$ to produce a combustion gas of high speed. The combustion gas is cooled by the air introduced into the downstream side $46_B$ of the combustion chamber 46 via the holes 421 and 441, as shown by the arrows F, and is, via the guide blades 36, as shown by the arrow O, directed to the turbine blades 32, as shown by the arrow M, to rotate the main shaft 20.

During the above-mentioned operation, the vaporized fuel from the fuel inlet port 80 cannot be contacted with the air of high temperature from the air passageways 50 and 48, until the fuel has reached the injection nozzles 62a and 62b via the fuel nozzles 72a and 72b, respectively. Therefore, a flow of a combustible mixture, which is ejected into the combustion zone $46_A$ at high temperature, as shown by the arrows L and L', respectively, is formed in the injection nozzles 62a and 62b. Since the nozzles are located at a position near the combustion zone $46_A$, the combustible mixture is ejected into the combustion zone $46_A$ just after the mixture is formed in the injection nozzles 62a and 62b. Therefore, when air of a temperature above 450° C. (higher than a temperature to ignite the fuel) is introduced into the injection nozzles 62a and 62b, the uncontrolled ignition (pre-ignition) of the combustible mixture in the injection nozzles 62a and 62b, as well as propagation of the flame from the combustion zone $46_A$ into the nozzles 62a and 62b (so-called back fire), does not occur, even if the speed of the flow of the combustible mixture in the nozzles 62a and 62b is relatively low. This permits a gas turbine engine of very safe construction to be provided.

Figure 3:
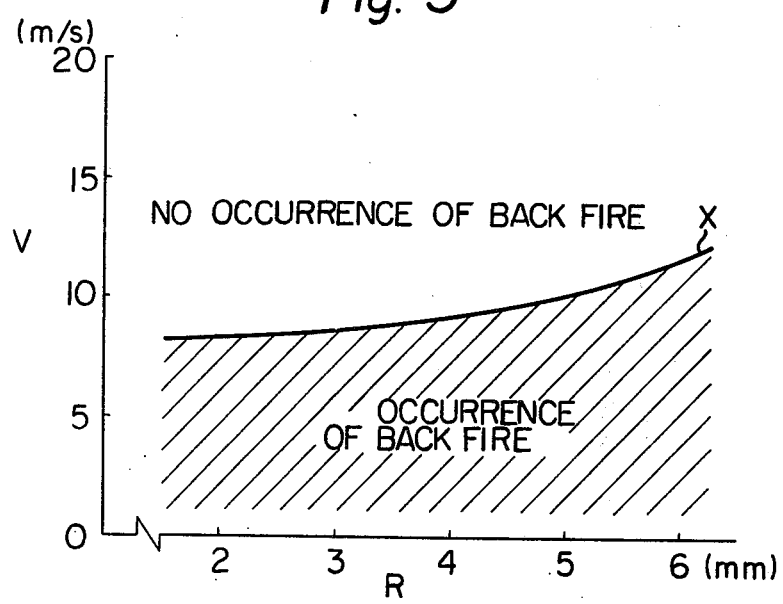
FIG. 3 is a graph showing the back-fire preventing effect of the present invention.

In FIG. 3, a curve X indicates the condition in which back fires take place, when an air flow having a temperature of 700° C. is introduced into the passageways 48 and 50. In this graph, R is the diameter (mm) of the nozzles 62a and 62b and the speed V is the speed of the combustible mixture passing through the nozzles 62a and 62b. As will be clear from FIG. 3, back fires can be prevented when the diameter of the nozzles 62a and 62b is in the range of 2 to 6 mm under the speed range of the combustible mixture of 15–120 m/s, at which speed range the gas turbine engine for an automobile is normally operated.

It should be noted that the fuel ejected into the injection nozzle 62a (62b) via the fuel nozzles 72a (72b) is effectively mixed with the air in the nozzles 62a (62b), since each of the nozzles 72a (72b) is opened to the corresponding nozzle 62a (62b) at a position spaced apart from an end of the nozzle 62a (62b) in such a manner that the axes of the nozzles 62a (62b) and the nozzles 72a (72b) are inclined to each other. Therefore, a strong turbulence is formed in the nozzles 62a (62b) which causes the fuel to be well mixed with the air in the nozzles 62a (62b).

According to the present invention, the axes of a pair of a first injection nozzle 62a and a second injection nozzle 62b are inclined with respect to each other in such a manner that said axes intersect at a position in the combustion zone $46_A$ as is clearly seen from FIG. 1. Therefore, the violent contact of the flows of the combustible mixture from the nozzle pair 62a and 62b, as shown by the arrow L and L', occurs in a combustion zone $46_A$. This causes a strong turbulence of flow in the combustion zone $46_A$ and, thus, a rapid and stable combustion of the combustible mixture is effected in the combustion zone $46_A$. Due to the stable combustion, a relatively lean air-fuel mixture can be used without any difficulty. This permits a decrease of the temperature during the combustion process in the combustion zone $46_A$. Due to the rapid combustion, the length of the flame caused by the combustion can be shortened. Thus, cool air can be introduced into the combustion chamber 46, as shown by the arrows F, at a position near the combustion zone $46_A$, which causes the combustion gas to be cooled rapidly. Since the amount of $NO_x$ emission corresponds to both the combustion temperature and period required for combustion, as is well known to those skilled in this art, the amount of $NO_x$ emission is effectively suppressed according to the present invention.

While this invention is illustrated with reference to the accompanying drawings, many modifications and changes can be made by those skilled in this art without departing from the scope and spirit of the invention.

What is claimed is:

1. A gas turbine engine comprising:
  a housing assembly;
  a shaft rotatably supported by the housing assembly;
  a set of compressor blades fixed to the shaft, said housing assembly forming an air passageway of annular shape adapted for receiving a flow of air from the compressor blades;
  a set of turbine blades fixed to the shaft in the housing assembly in such a way that the turbine blades are spaced apart from the compressor blades;
  a combustion chamber of annular shape located inside the housing assembly, said chamber facing, on a downstream side thereof, the turbine blades so as to cause the flow of combustion gas to be directed toward the turbine blades to rotate the shaft, said chamber having, on an upstream side thereof, an annular wall adapted to isolate the combustion chamber from the annular air passageway, which annular wall defines a plurality of circumferentially spaced apart injection nozzles for communicating the air passageway with the combustion chamber so as to direct an amount of heated air from the passageway to the combustion chamber and defines a plurality of fuel nozzles which, on one end thereof, open directly into the corresponding injection nozzles, and are, on the other end thereof, opened to an annular fuel chamber formed in the circumferential direction of said wall, and;

means for introducing vaporized fuel into said annular fuel chamber so as to direct the fuel into the corresponding injection nozzles via the corresponding fuel nozzles so that a combustible mixture is formed in each injection nozzle, which mixture is ejected into the combustion chamber.

2. A gas turbine engine according to claim 1, wherein each said fuel nozzle opens directly into the corresponding injection nozzle at a position spaced from one end of the injection nozzle near to the combustion chamber in such a manner that the axes of each fuel nozzle and the corresponding injection nozzle are inclined with respect to each other.

3. A gas turbine according to claim 2, wherein the diameter of each of the injection nozzles is in the range of 2-6mm, and means for moving the combustible mixture directed to the combustion chamber via each of the injection nozzles at a speed in the range of 15-120 m/s.

4. A gas turbine engine according to claim 1, wherein a first and a second spaced apart row of the injection nozzles are defined along the opposite sides of the annular fuel chamber, two adjacent injection nozzles of the first and second rows having axes which are inclined with respect to each other in such a manner that the axes intersect each other at a position in the annular combustion chamber, whereby a violent contact of flows of combustible mixture ejected from said adjacent injection nozzles of the first and the second rows occurs in said combustion chamber, causing a strong turbulence of flow to be generated in the combustion chamber.

5. A gas turbine engine comprising:
a housing;
a shaft rotatably supported by the housing;
a plurality of compressor blades secured to the shaft adjacent one axial end of the housing;
said housing defining an annular air passageway through which air from the compressor blades moves;
a plurality of turbine blades secured to the shaft in the housing and spaced from the one axial end thereof;
an annular combustion chamber defined in the housing between the compressor blades and the turbine blades, said chamber being in fluid communication downstream thereof with the turbine blades so that the combustion gas is directed to the turbine blades to rotate the shaft;
an annular wall defining the upstream end of said combustion chamber, said wall being between said chamber and said annular air passageway, said wall having a plurality of circumferentially spaced injection passages therethrough for directly fluidly communicating the air passageway with the combustion chamber, having a plurality of passages for fuel therein, and having a circumferentially extending fuel chamber defined therein; one end of each of said injection passages opening directly into said combustion chamber and the other end thereof opening directly into said passageway; each of said fuel passages having one end opening directly into said fuel chamber and the other end thereof opening directly into a corresponding one of the injection passages in a region thereof spaced from the one end thereof; and means for feeding vaporized fuel into said fuel chamber whereby the fuel is directed through the fuel passages into the injection passages where a combustible air-fuel mixture is formed which is then directed into the combustion chamber.

6. A gas turbine engine comprising:
a housing assembly;
a shaft rotatably supported by the housing assembly;
a plurality of compressor blades secured to the shaft adjacent one axial end of the housing assembly;
said housing assembly comprising:
an outer substantially radially extending front housing;
an inner substantially radially extending front housing axially spaced from said outer housing and defining a first passageway for air therebetween, said passageway having the downstream end of said compressor blades in the upstream end thereof;
an outer subtantially axially extending tubular housing secured to the radially outer end of said outer front housing and surrounding said shaft;
an inner substantially axially extending tubular housing secured to the radially outer end of said inner front housing and surrounding said shaft, spaced radially inwardly from said outer tubular housing and defining a second axially extending passageway for air therebetween, the upstream end of which is directly fluidly connected to the downstream end of the first passageway;
a plurality of turbine blades secured to the shaft in the housing assembly and spaced from the one axial end thereof;
means defining an annular combustion chamber surrounding the shaft, being radially between it and the inner tubular housing, and being axially between the compressor blades and the turbine blades, the downstream end of said combustion chamber being fluidly connected to said turbine blades, said combustion chamber defining means comprising:
an outer annular axially and radially extending tubular wall;
an inner annular and axially and radially extending tubular wall axially spaced from said outer tubular wall; and
an annular wall member extending substantially axially between the radially inner ends of the inner and outer tubular walls;
said inner and outer tubular walls defining, with other components of said housing assembly, third and fourth passageways for air respectively exterior of said chamber, the upstream end of said third and fourth passageways being fluidly connected to the downstream end of the second passageway and the downstream end of said third and fourth passageways being immediately adjacent said wall member;
means defining a circumferentially extending chamber for fuel in said wall member;

means defining a first plurality of circumferentially spaced substantially straight injection passages in said wall member, one end of each of said first injection passages being directly fluidly connected to the downstream end of said third passageway and the other end thereof being directly fluidly connectly to the combustion chamber;

means defining a second plurality of circumferentially spaced substantially straight injection passages in said wall member corresponding to said first fuel injection passages, one end of each of said second injection passages being directly fluidly connected to the downstream end of the fourth passageway and the other end thereof being directly fluidly connected to the combustion chamber;

corresponding ones of said first and second injection passages lying in substantially the same radial plane and having axes which intersect each other in the combustion chamber with an angle of 30 to 90 degrees between them;

means defining a first plurality of circumferentially spaced passages for fuel in said wall member, one end of each of said first fuel passages being directly fluidly connected to said fuel chamber and the other end thereof being directly fluidly connected to a region of a corresponding one of said first injection passages spaced from the other end thereof;

means defining a second plurality of circumferentially spaced passages for fuel in said wall member, one end of each of said second fuel passages being directly fluidly connected to said fuel chamber and the other end thereof being directly fluidly connected to a region of a corresponding one of said second injection passages spaced from the other end thereof; and means for feeding vaporized fuel into said fuel chamber whereby the fuel is directed through the first and second fuel passages into the first and second injection passages respectively where a combustible fuel mixture is formed which is then directed into the combustion chamber where the mixture is further mixed by collision with that from the other corresponding injection passage.

* * * * *